US007731085B2

(12) United States Patent
Gillespie et al.

(10) Patent No.: US 7,731,085 B2

(45) **Date of Patent: *Jun. 8, 2010**

(54) PRODUCT DISPLAY

(75) Inventors: Brian John Gillespie, San Francisco, CA (US); Patricia Ann (Kennedy) Kulich, Denver, CO (US)

(73) Assignee: The Procter + Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/182,226

(22) Filed: Jul. 30, 2008

(65) Prior Publication Data

US 2008/0308572 A1 Dec. 18, 2008

Related U.S. Application Data

(63) Continuation-in-part of application No. 11/483,936, filed on Jul. 10, 2006, now Pat. No. 7,665,659.

(51) Int. Cl.
*G06K 7/08* (2006.01)

(52) U.S. Cl. ......................... 235/381; 221/92; 221/155; 434/367; 434/429

(58) Field of Classification Search ................. 235/381; 221/92, 155; 434/367, 429
See application file for complete search history.

(56) References Cited

U.S. PATENT DOCUMENTS

| | | | | |
|---|---|---|---|---|
| 4,809,847 | A | 3/1989 | Schneider | |
| 5,337,897 | A * | 8/1994 | Yablans | 206/581 |
| 5,370,233 | A | 12/1994 | Schutz et al. | |
| 5,566,830 | A * | 10/1996 | Margolin | 206/730 |
| 6,336,564 | B1 | 1/2002 | Garnier | |
| 6,745,509 | B1 * | 6/2004 | Lapp | 40/661 |
| 2002/0157983 | A1 * | 10/2002 | Krupka et al. | 206/466 |
| 2002/0175175 | A1 | 11/2002 | Oshinkskv | |
| 2003/0015787 | A1 | 1/2003 | Geissinger et al. | |
| 2003/0052040 | A1 | 1/2003 | Brener et al. | |
| 2004/0124102 | A1 * | 7/2004 | Chalmers | 206/216 |
| 2004/0216339 | A1 * | 11/2004 | Garberg et al. | 40/308 |
| 2005/0017146 | A1 * | 1/2005 | Kringel et al. | 248/313 |
| 2005/0055361 | A1 * | 3/2005 | Deal | 707/100 |
| 2005/0092554 | A1 | 5/2005 | McGillin et al. | |
| 2005/0275800 | A1 | 12/2005 | Krombholz et al. | |
| 2006/0186257 | A1 * | 8/2006 | Rigas | 242/560.2 |
| 2006/0201841 | A1 * | 9/2006 | Mohr et al. | 206/395 |

(Continued)

FOREIGN PATENT DOCUMENTS

DE 600 952 C 8/1934

(Continued)

OTHER PUBLICATIONS

Photograph of display in retail store taken Jun. 3, 2006.

*Primary Examiner*—Allyson N Trail
(74) *Attorney, Agent, or Firm*—Betty J. Zea

(57) ABSTRACT

A display for two or more products having two or more three-dimensional visual aspects providing visual information about two or more products. The visual aspect has a first visual product, a second visual product, a first sampling aspect for the first visual product, a second sampling aspect for the second visual product, product samples associated with both the first and the second sampling aspects, and a dispenser for dispensing the product samples.

21 Claims, 15 Drawing Sheets

U.S. PATENT DOCUMENTS

2007/0273253 A1* 11/2007 Fair ........................... 312/140
2008/0006552 A1 1/2008 Vonderlack et al.
2008/0006692 A1* 1/2008 Gillespie et al. ............ 235/381

FOREIGN PATENT DOCUMENTS

EP 0 774 224 A 5/1997
EP 1 231 151 A2 8/2002
GB 2 192 612 A 1/1988
GB 2201650 A 9/1988

* cited by examiner

PRODUCT DISPLAY

CROSS REFERENCE TO RELATED APPLICATION

This application is a continuation-in-part of U.S. patent application Ser. No. 11/483,936, filed Jul. 10, 2006 now U.S. Pat. No. 7,665,659.

FIELD OF THE INVENTION

This invention relates generally to a display, and more specifically to a display displaying a product and, in certain embodiments, capable of providing samples of the product.

BACKGROUND OF THE INVENTION

A number of challenges arise in the area of product display. In typical retail settings, a product display may not allow the consumer to view or inspect the actual packaged product, and it does not offer samples of the product. Various features of some products, such as texture, thickness, softness, smoothness, durability, and/or scent, may impact a consumer's purchasing decision, and should be presented to the consumer for consideration. However, because of shelf space limitations or product packaging constraints, these important product features may not be available to the consumer. A consumer who is able to evaluate the product's features prior to purchasing the product is able to make a better informed purchasing decision.

Further, it can be difficult for a manufacturer to show a display or provide a product sample to the consumer. In direct-consumer warehouses, products are often arranged, for example, in palletized form in aisles of the store, without any associated display. In typical retail stores such as grocery stores, convenience stores, and supermarkets, displays may be handled through specific vendors, which can make it difficult for a company to introduce new displays to a store.

Thus, a need exists for a display that allows the consumer to view or inspect the product, and, in some embodiments, provides a sample of the product displayed. A need further exists for a display that is substantially interchangeable with a product unit such that the display may be incorporated into units for distribution or display such as palletized units.

SUMMARY OF THE INVENTION

In one embodiment the present invention relates to a display for two or more products comprising two or more three-dimensional visual aspects providing visual information about two or more products. The visual aspect comprises a first visual product, a second visual product, a first sampling aspect for the first visual product, a second sampling aspect for the second visual product, product samples associated with both the first and the second sampling aspects, and a dispenser for dispensing the product samples.

In another embodiment, the present invention relates to a combined display for one or more products comprising a first display and a second display. The first and second displays each comprise a three-dimensional visual aspect providing visual information about the product. The visual aspect including a visual product, a sampling aspect, product samples associated with the sampling aspect, and a dispenser for dispensing the product samples. The display further comprises two or more means for attaching the first display to the second display.

In yet another embodiment, the present invention relates to a display for a product comprising a three-dimensional visual aspect providing visual information about the product. The visual aspect includes a visual product, a sampling aspect, product samples associated with the sampling aspect, a dispenser for dispensing the product samples, and a display flap.

While multiple embodiments are disclosed, still other embodiments of the invention will become apparent to those skilled in the art from the following detailed description, which shows and describes illustrative embodiments of the invention. As will be realized, the invention is capable of modifications in various obvious aspects, all without departing from the spirit and scope of the invention. Accordingly, the drawings and detailed description are to be regarded as illustrative in nature and not restrictive.

DETAILED DESCRIPTION OF THE DRAWINGS

A display, and more specifically a display displaying a product and, in certain embodiments, providing samples of the product, is provided. The display may be used for displaying any type of goods, including, for example, consumer goods. In one embodiment, the display may be used to display products that generally are provided to consumers in rolled form, such as, for example, paper toweling or bath tissue. The display also may be used to display products that generally are provided to consumers in a stacked form, whether or not overlapping, such as facial tissue, table napkins, wipes (e.g., disinfectant, cleansing, facial, hand, baby, perineal), etc. The display also can be used to display consumer goods that are provided to consumers in bags, containers, bottles, boxes, or cans, such as lotion, moisturizer, coffee, tea, perfumes, snack foods, diapers, catamenial devices, wound care dressings, incontinence pads, bandages, training pants, etc. It is to be recognized that some consumer products may be provided in more than one form, and in more than one type of packaging, and the display may be modified to display the consumer product in any form. Further, each of the disclosed displays may be refilled with further or alternate products or product samples to be dispensed.

FIGS. 1*a*, 1*b*, 1*c* and 2 illustrate one embodiment of a display 10 for a rolled product. The rolled product may be a paper product, such as bath tissue or paper towels.

Figure 1A:
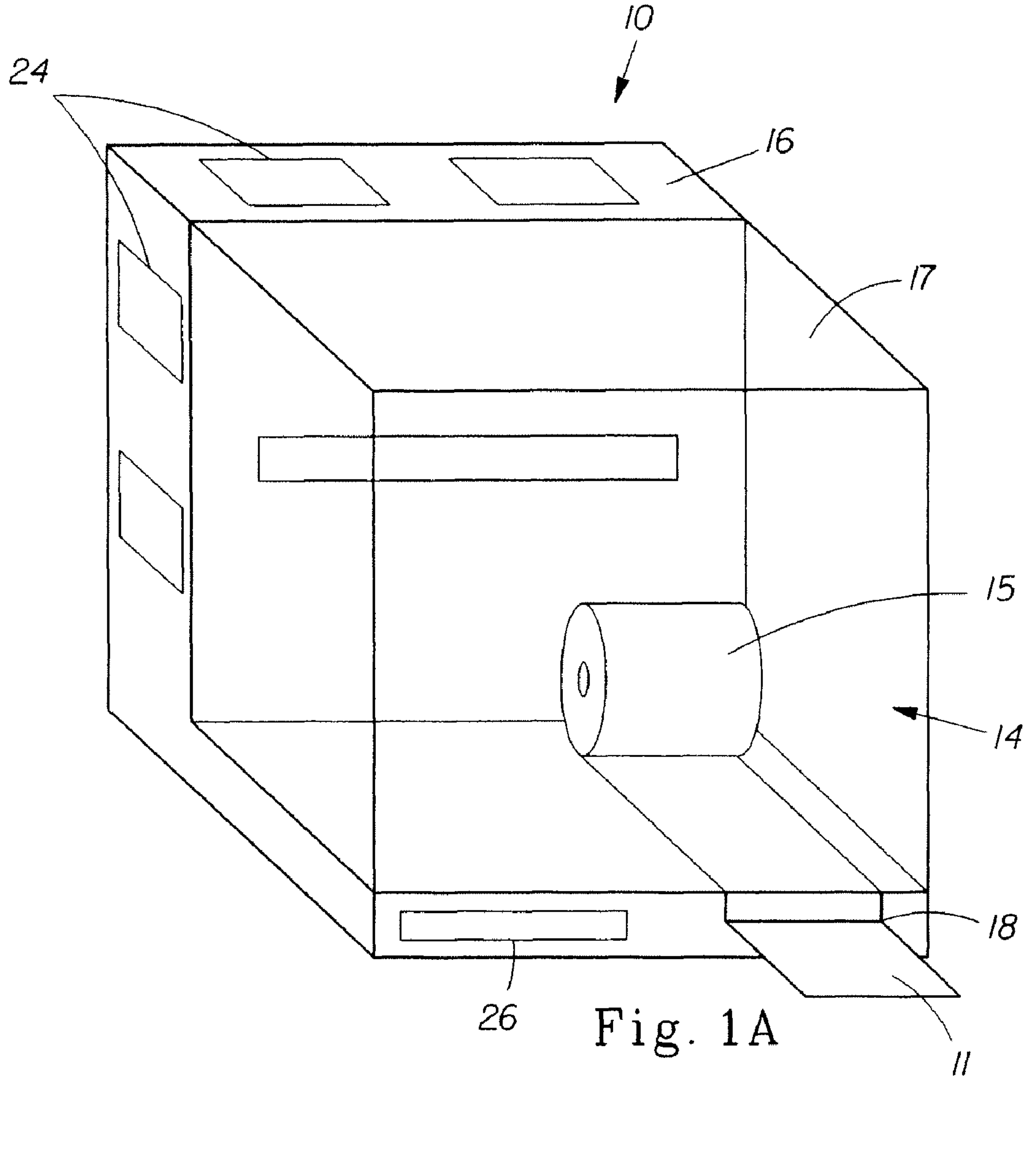
FIG. 1*a* illustrates an exemplary display for a rolled product in accordance with one embodiment of the present invention.
Figure 1B:
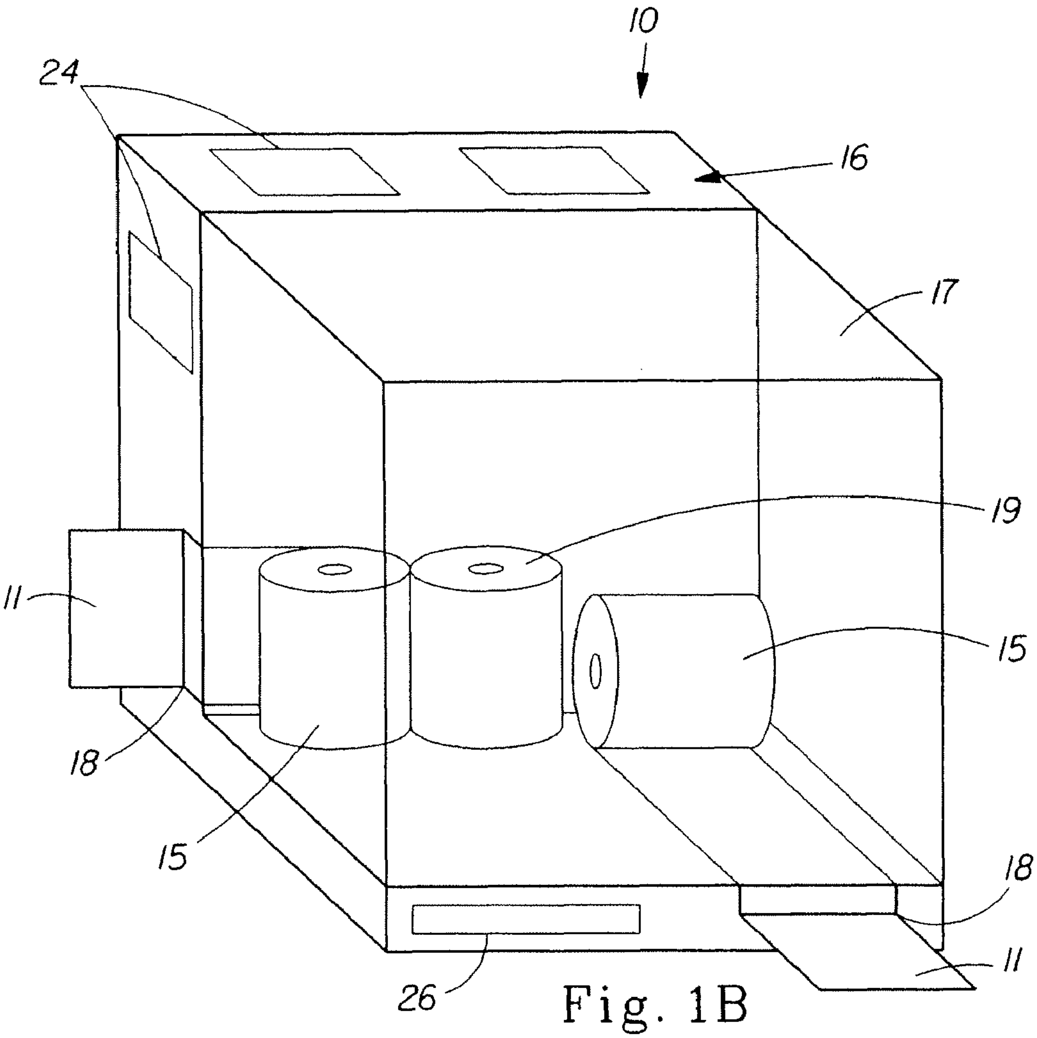
FIG. 1*b* illustrates an exemplary display for a rolled product in accordance with a further embodiment of the present invention.
Figure 2:
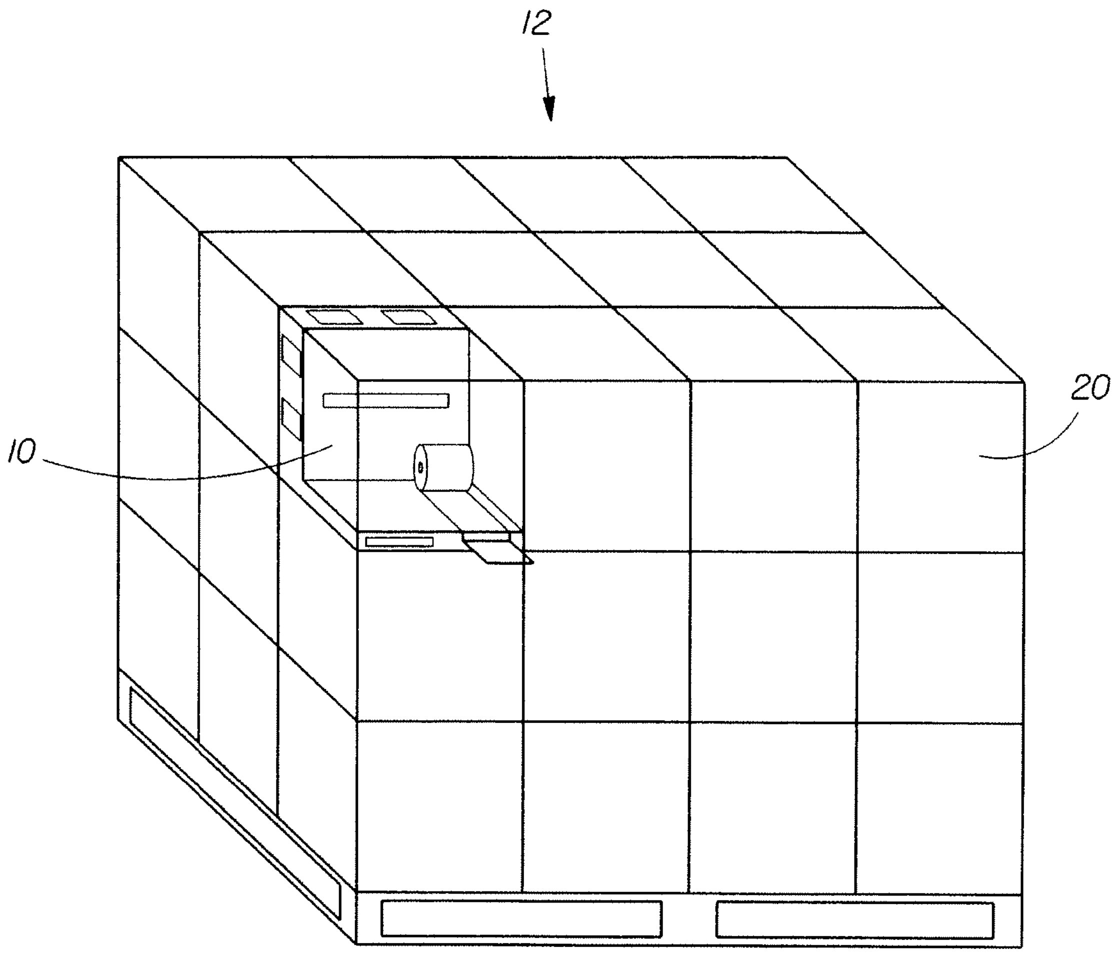
FIG. 2 illustrates an exemplary display of FIG. 1*a* incorporated into a palletized unit in accordance with one embodiment of the present invention.

FIG. 1*a* illustrates the display 10 and FIG. 2 illustrates an embodiment of the display 10 in a palletized product unit 12. FIG. 1*b* illustrates an alternative embodiment to FIG. 1*a*. As shown, the display 10 includes a visual aspect 14, a sampling aspect 16, and as shown in FIGS. 1*a* and 1*b*, a dispenser 18. While the product shown in FIGS. 1*a*, 1*b*, and 2 is a rolled product, one skilled in the art will recognize many aspects of the description of FIGS. 1*a*, 1*b*, and 2 will apply to any type of product in any configuration. Further, the display may, in certain embodiments, include a visual aspect 14, but may exclude one or both of a sampling aspect and dispensing aspect.

The visual aspect 14 includes a product display showing the product, and may include advertising information, or other items of visual interest. In the embodiment of FIGS. 1*a*, 1*b*, and 2, the visual aspect 14 comprises a three-dimensional display. The item shown by the visual aspect 14 is herein generally referred to as a visual product 15. If the visual product 15 reflects the product sold, the visual product 15 may be an actual product or may be a visual simulation or reproduction of the product. The visual aspect 14 may comprise a base, upon which the visual product rests, and, as shown in FIGS. 1*a* and 1*b*, may further comprise a shield 17 (such as a transparent material) for protecting the visual product 15.

In alternative embodiments, as shown in FIG. 1*b*, more than one visual product 15 may be associated with the visual aspect 14. The visual products may be substantially the same or may be different. Further, the visual products may be provided at different orientations to display different aspects of the visual product. Thus, for example, different textures, weaves, etc. may be shown from different orientations. Further, the visual aspect 14 may include a visual product comprising the actual product and/or a visual product comprising a simulation or reproduction of the product. As shown, a dispenser 18 may be associated with one or more of the visual products 15, while other visual products 19 may have no associated dispenser.

Figure 1C:
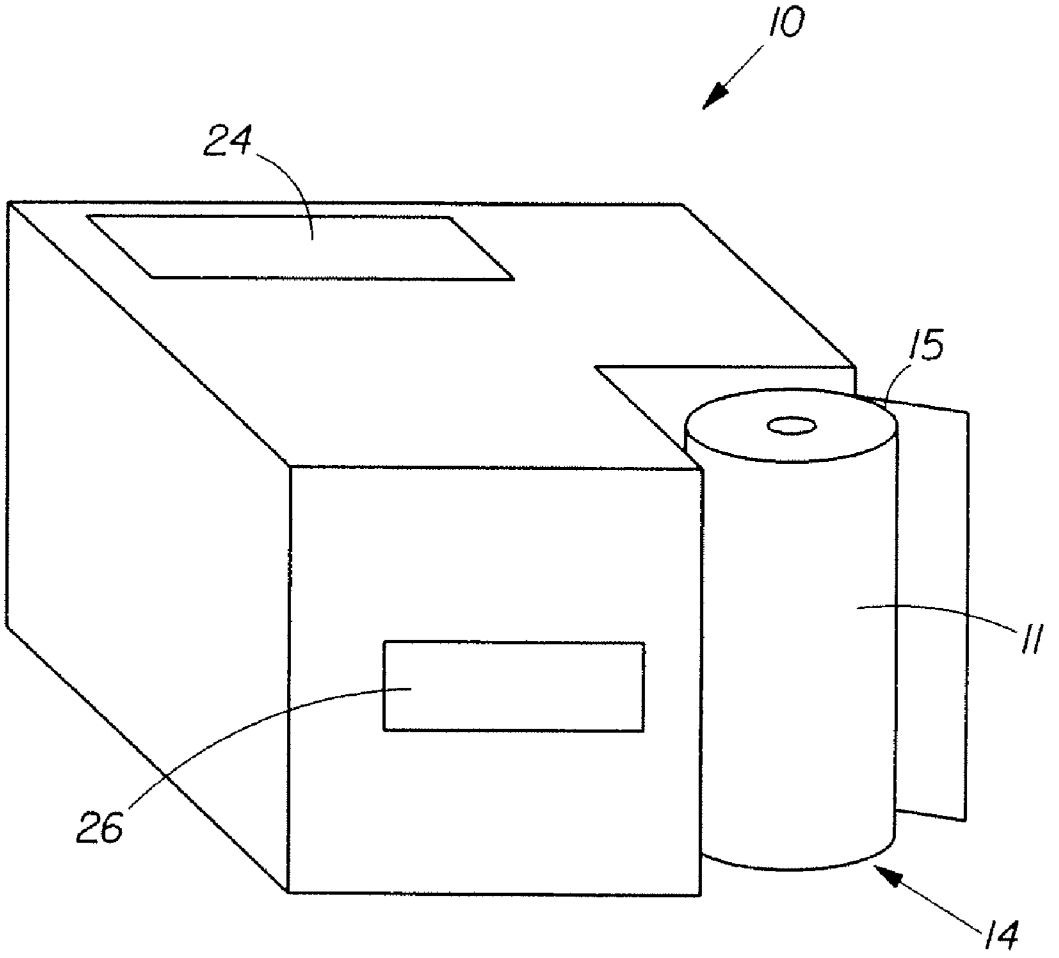
FIG. 1*c* illustrates an exemplary display for a rolled product in accordance with a further embodiment of the present invention.

In an alternative embodiment as may be exemplified in FIG. 1*c*, the visual product is displayed at the corner of the display 10.

In the embodiments of FIGS. 1*a*, 1*b*, 1*c* and 2, product samples are associated with the sampling aspect 16. Such association may be by, for example, providing the product samples, in whole or part, within the sampling aspect 16. A dispenser 18 is operably disposed with the sampling aspect 16 for dispensing the product samples to a consumer. The dispenser 18 may be located on a front surface, a side surface, a top surface, a bottom surface, or other suitable location of the sampling aspect 16. The sampling aspect 16 may be configured such that the product samples associated with the sampling aspect 16 are not visible to the consumer. In the embodiment shown, the product samples comprise a material that exits the display 10 through the dispenser 18. The dispenser 18 may be positioned in a manner with respect to the visual product 15 to provide the appearance that the material exiting the dispenser 18 could be part of visual product 15.

The product samples associated with the sampling aspect 16 may be provided in the same configuration in which they are sold. Thus, the product samples may comprise a roll of bath tissue. The product samples may alternatively be provided in any suitable configuration. For example, individual sheets of bath tissue may be provided, or the bath tissue may be provided in a continuous folded strip, with each perforated or scored fold being in the opposite direction. Alternatively, a roll of tissue larger than that typically sold to consumers may be used with the sampling aspect 16. In further embodiments, the sampling aspect 16 may comprise multiple sources. For example, multiple sampling rolls may be provided such that, upon depletion of one roll, another may be used. Further, the sampling aspect 16 may be refilled with additional or alternative product samples.

While FIGS. 1*a*, 1*b*, and 2 illustrate displays wherein the product samples 11 substantially mimic the visual product 15, the product samples 11 may differ in form, size, or other from the visual product 15. Thus, for example, the visual product may comprise a roll of bath tissue while the product samples may comprise folded individual tissues.

In use, product samples associated with the sampling aspect 16 may be fed to the dispenser 18, thereby allowing a consumer to remove a sample 11 of the visual product 15 from the dispenser 18. When a consumer takes the sample 11 from the dispenser 18, material is removed from the sampling aspect 16, and the visual product 15, which is not connected to the material in the sampling aspect 16, is neither moved nor disturbed.

In an alternative embodiment, the sampling aspect 16 may be operatively associated with the visual product 15 such that, for example, when a consumer takes the product sample 11 from the dispenser, the visual product 15 appears to rotate. Mechanical and/or electrical components may be used to effect rotation of the visual product. Thus, the sampling aspect 16 may be operatively associated with the visual product 15 in any suitable manner such that product samples 11 from the sampling aspect 15 appear to be drawn from the visual product 15.

As shown in the embodiments of FIGS. 1*a* and 1*b*, the visual aspect 14 may be located in front of the sampling aspect 16. Thus, there is no visual obstruction of the visual aspect 14. The visual aspect 14 may alternatively be provided in any suitable location of the display 10. As shown, the visual product 15, visual aspect 14, and dispenser 18 may be designed such that it appears the visual product 15 is being dispensed from the dispenser 18. A visual display and a product sample are thus provided. Upon depletion of the product samples associated with the sampling aspect 16, the display 10 does not appear empty and retains value as a visual display of the visual product 15 via the visual aspect 14.

Other features may be included with the display 10. For example, advertising indicia, embellishments, coupons, recorded messages, audio, video, etc. may be added to the display 10. FIGS. 1*a* and 1*b* illustrate advertising text 24 and instructions 26 to take a sample of the product.

As shown in FIG. 2, the display 10 may be sized to correspond generally with the size of a unit 20 of the product. Thus, the display 10 may be provided in a form suitable for distribution or display. Generally, products have particular geometries for distribution or display. For example, in palletized shipping, a particular number of units of a particular size may be loaded on a pallet. Typically, each pallet includes only units of a particular size. Thus, the display 10 may be provided having a geometry substantially the same as the geometry of a unit for loading on the pallet. Thus, the display 10 may be substantially interchangeable with a regular product unit. Alternatively, the display 10 may be sized so as to be substantially interchangeable with more than one regular product unit. Further, while the display 10 may not be shipped as part of, for example, a pallet, the geometry of the unit may be of importance in display. Thus, the display may be provided having a geometry substantially the same as the geometry of a unit of the product as would be placed on a shelf. Thus, the display 10 may be provided having a geometry substantially the same as the geometry of a unit for any distribution or display purpose. Accordingly, it is not necessary to rearrange a shipping container or store space to fit the display 10.

In the embodiment of FIG. 2, the display 10 is provided in the form of a unit 12 in lieu of a regular unit 20 of the product. The display 10 has geometry substantially the same as a regular unit 20 of the product. In such configuration, the display 10 may be sent to stores with normal shipment of the product, or may be sent separately and added at any time. In certain retail outlets, such as, for example, direct-consumer warehouses, a unit 12 may be placed within a pallet in an aisle with the display 10 provided as shown. Thus, the display illustrating the product and/or providing product samples may be put before the consumer using only normal distribution of the product. Further, in an embodiment where the display 10 has substantially the same geometry of product units for placement in the store, the display 10 may easily be placed in the store in the place of a normal product unit without requiring rearrangement of the products for sale.

Figure 3:
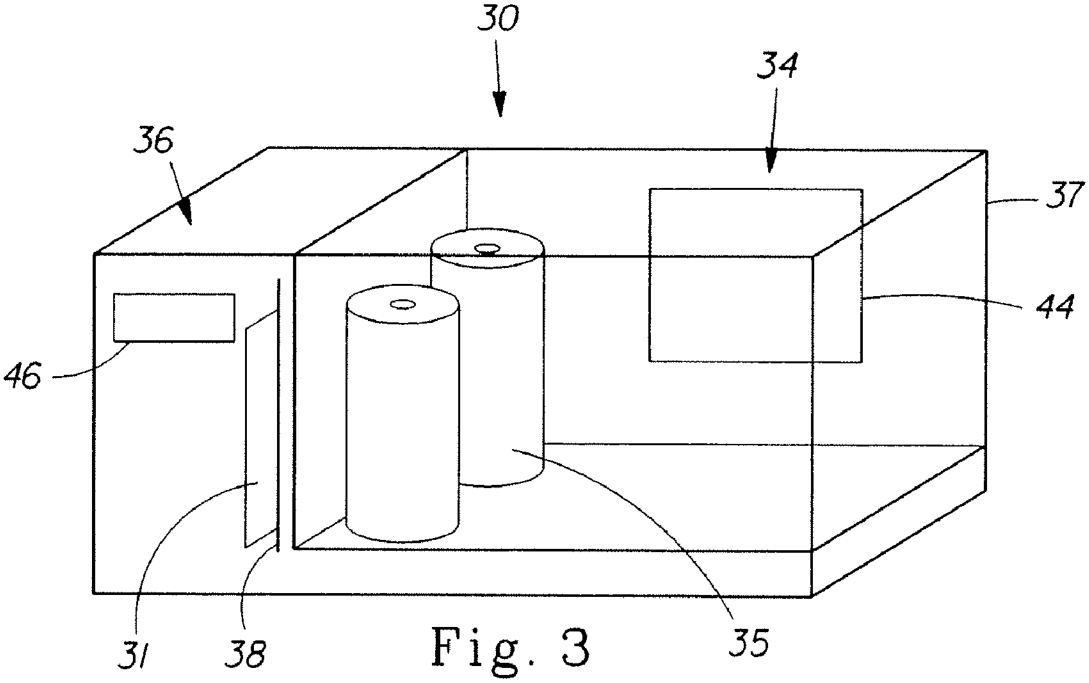
FIG. 3 illustrates an exemplary display for a rolled product in accordance with another embodiment of the present invention.
Figure 4:
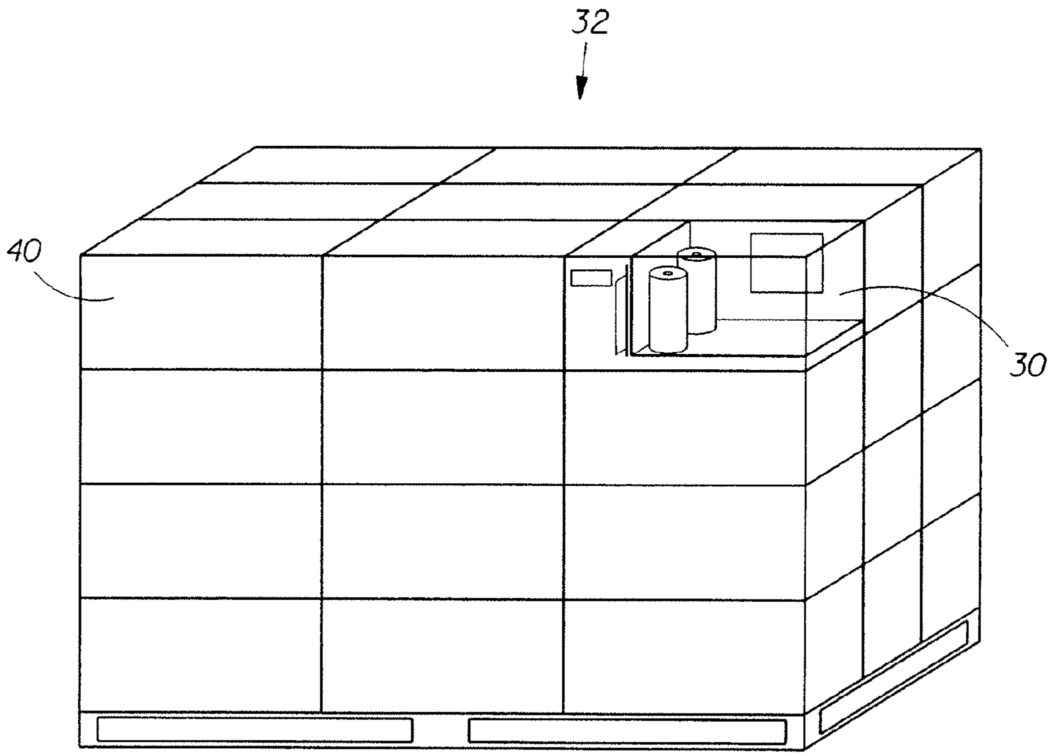
FIG. 4 illustrates an exemplary display of FIG. 3 incorporated into a palletized unit in accordance with another embodiment of the present invention.

FIGS. 3 and 4 illustrate one embodiment of a display 30 for another rolled product, such as paper towels. FIG. 3 illustrates the display 30 and FIG. 4 illustrates the display 30 in a palletized product unit 32. As shown, the display 30 includes a visual aspect 34, a sampling aspect 36, and a dispenser 38. In alternative embodiments, the display 30 may include any combination of the visual aspect 34, the sampling aspect 36, and the dispenser 38 and need not include each of the visual aspect 34, the sampling aspect 36, and the dispenser 38.

The visual aspect 34 includes a product display showing the product, and may include advertising information, or other items of visual interest. The item shown by the visual aspect 34 is generally referred to herein as a visual product 35. If the visual product 35 reflects the product sold, the visual product 35 may be an actual product, or it may be a visual simulation or reproduction of the product. In the embodiment shown, the visual aspect 34 is three-dimensional. As shown in the embodiment of FIG. 3, more than one visual product may be shown in the visual aspect 34. The visual aspect 34 may comprise a base, upon which the visual product 35 rests, and a shield 37 for protecting the visual product 35. The shield 37 may be a transparent material or any other suitable material.

Product samples may be associated with the sampling aspect 36 for dispensing to a consumer via the dispenser 38. The dispenser 38 may be located on a front surface, a side surface, a top surface, a bottom surface, or other suitable location of the sampling aspect 36. The product samples may be, for example, provided in whole or part within the sampling aspect 36. The product samples may be provided in the configuration sold. Thus, for example, the product samples may comprise a roll of paper towels. Alternatively, the product samples may be provided in any suitable configuration. For example, individual paper towel sheets may be provided, or the paper towels may be provided in a continuous folded strip, with each perforated or scored fold being in the opposite direction. Alternatively, a roll of paper towels larger than that typically sold to consumers may be used with the sampling aspect 36. The product samples associated with the sampling aspect 36 are fed to the dispenser 38. Thus, a consumer may remove a sample 31 of the product from the dispenser 38.

As shown in the embodiment of FIG. 3, the visual aspect 34 may be located on one side of the display 30 while the sampling aspect 36 may be located on the other side of the display 30. Thus, there is no visual obstruction of the visual aspect 34. Alternatively, the visual aspect 34 and the sampling aspect 36 may be provided at any suitable location of the display 30. As shown, the visual product 35, visual aspect 34, and dispenser 38 may be designed such that it appears the visual product 35 is being dispensed from the dispenser 38. A visual display and a product sample are thus provided. Upon depletion of the product samples, the display 30 does not appear empty, and it retains value as a visual display of the visual product 35 via the visual aspect 34. Further, the sampling aspect 36 may be refilled with additional or alternative product samples upon or prior to depletion of the product samples.

Other features may be included with the display. For example, other advertising indicia, embellishments, coupons, recorded messages, audio, video, etc. may be added to the display. FIG. 3 illustrates advertising text 44 explaining new features of the product and instruction 46 to take a sample of the product.

As shown in FIG. 4, the display 30 may be sized to correspond generally with the size of a unit 40 of the product. Thus, the display 30 may be provided in shipping unit such as a palletized unit 32 or in a display unit in lieu of a regular unit 40 of the product.

Thus, the display 30 may be provided having a geometry substantially the same as the geometry of a unit for any distribution or display purpose. Accordingly, it is not necessary to rearrange a shipping container or store space to fit the display 30. In the embodiment of FIG. 4, the display 30 is provided in the form of a unit 32 in lieu of a regular unit 40 of the product. The display unit 32 has geometry substantially the same as a regular unit 40 of the product. In such configuration, the display 30 may be sent to stores with normal shipment of the product, or may be sent separately and added at any time. In certain retail outlets, such as, for example, direct-consumer warehouses, the palletized unit 32 may be placed in an aisle with the display 30 provided as shown. Thus, the display illustrating the product and/or providing product samples may be put before the consumer using only normal distribution of the product. In an embodiment where the display 30 has substantially the same geometry of product units for placement in the store, the display 30 may easily be placed in the store in the place of a normal product unit without requiring rearrangement of the product being sold.

Figure 5:
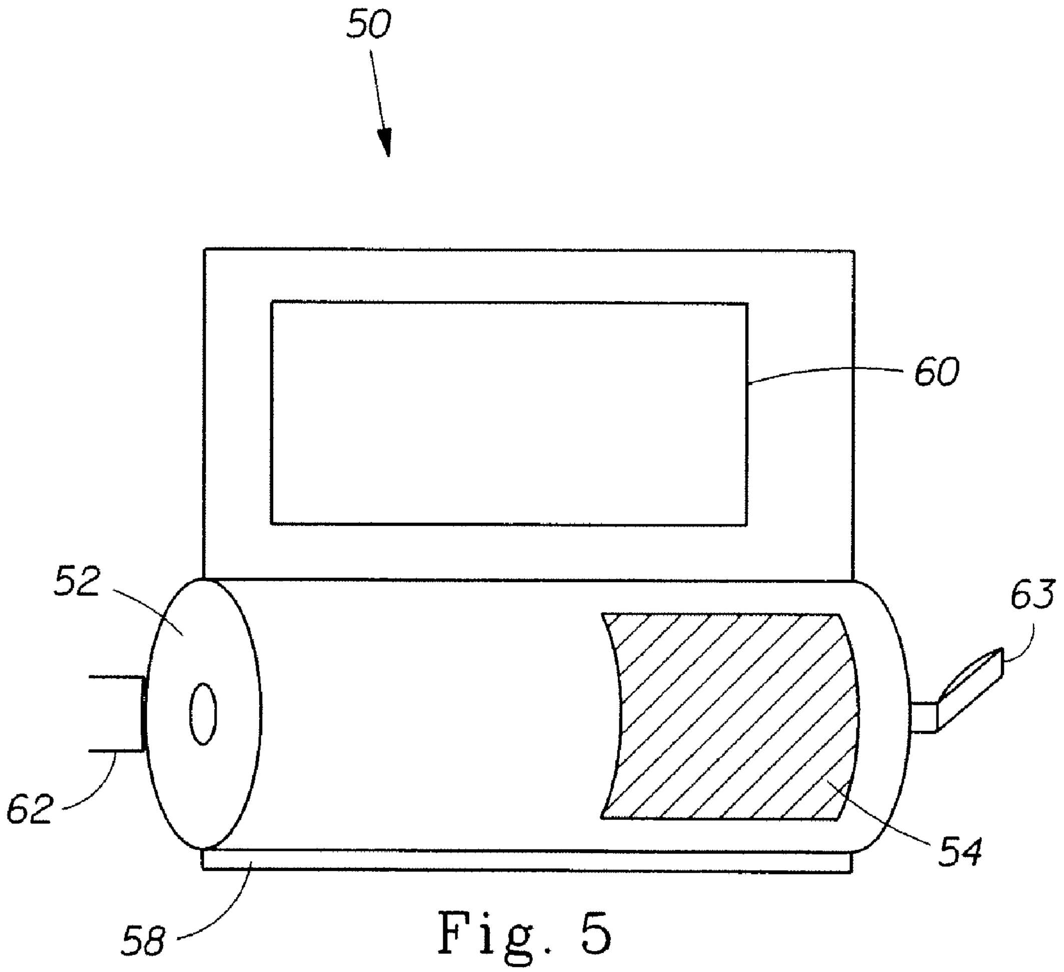
FIG. 5 illustrates an exemplary display for a rolled product in accordance with a further embodiment of the present invention.

FIG. 5 illustrates a display 50 for paper towels in accordance with a further embodiment. As shown, the display 50 includes a sampling aspect 52 and a sensory aspect 54. The sensory aspect 54 may be provided as a part of the sampling aspect 52.

The sensory aspect 54 provides a sensory interest via visual stimulation, tactile stimulation, olfactory stimulation, or other. Thus, for example, the sensory aspect 54 may comprise a region that has visual characteristics that reflect the product, that has tactile characteristics that reflect the product, or that has olfactory characteristics that reflect the product. Alternatively, the sensory aspect 54 may merely reflect desirable characteristics. The sensory aspect may be, for example, a rubber pad, a portion substantially simulating the product, or an actual piece of the product that is positioned on the outside of sampling aspect 52. The sensory aspect 54 also may comprise an actual piece of the product, or a representation or simulation of the product on sampling aspect 52. The sensory aspect 54 may be located behind a coating, window, or other protective material.

Product samples for sampling via a dispenser 58 may be associated with the sampling aspect 52. For example, the product samples may be provided, in whole or part, within the sampling aspect 52. The dispenser 58 may be located on at any suitable location of the sampling aspect 52. The display 50 may be configured such that, upon depletion of the product samples, the display 50 does not appear empty, and retains value as a display with the sensory aspect 54. Further, the sampling aspect 36 may be refilled with additional or alternative product samples upon or prior to depletion of the product samples.

In the embodiment of FIG. 5, as well as in other embodiments, a dispensing mechanism may be provided for use by the consumer to dispense product samples from the dispenser. The dispensing mechanism may be a handle 63 operatively coupled to the sampling aspect, or it may be any other suitable device or structure.

The display 50 may further include a coupling mechanism for coupling the display to a display structure. For example, the display 50 may include a clip 62 for coupling to a shelf or other display structure of a store. Thus, the display 50 may easily be provided near the product being sold.

Other features may be included with the display. For example, other advertising indicia, embellishments, coupons, recorded messages, audio, video, etc. may be added to the display. FIG. 5 illustrates advertising text 60.

Figure 6:
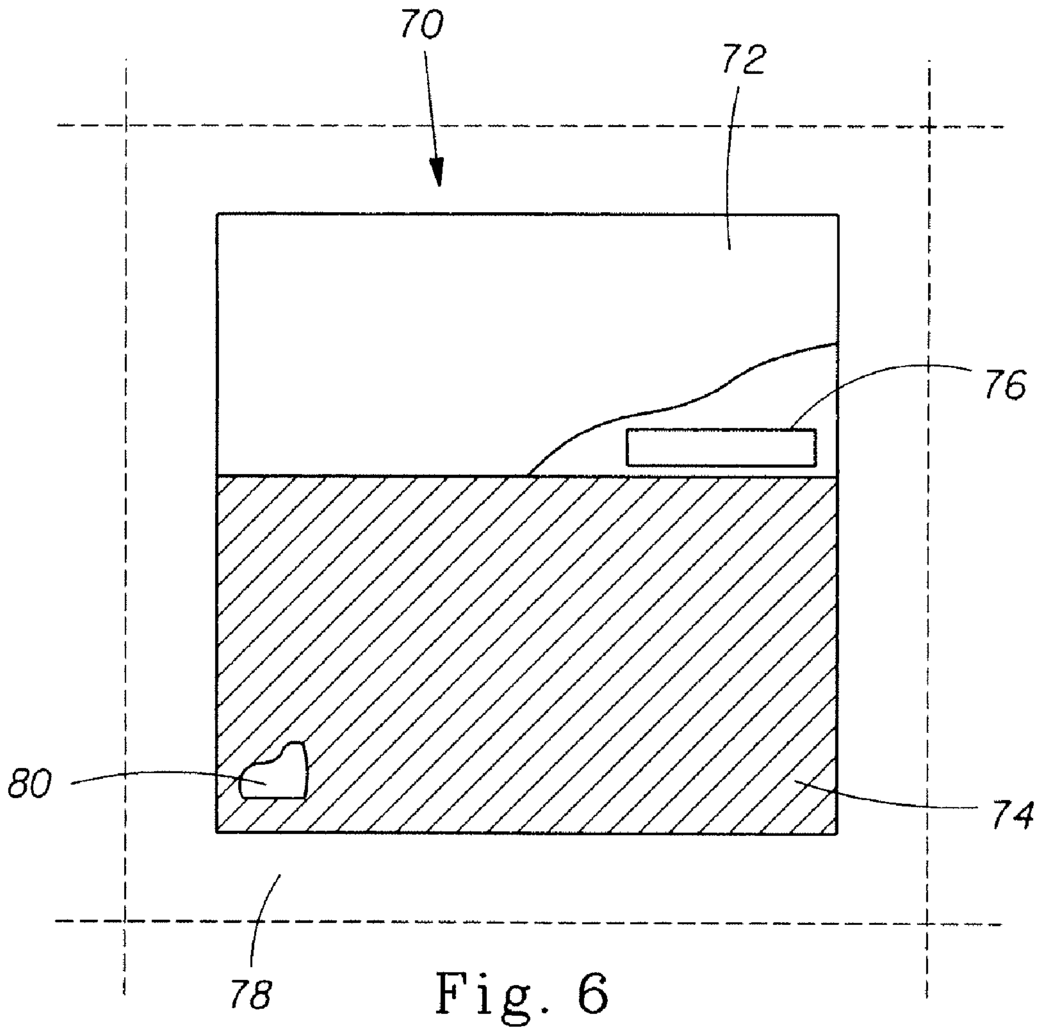
FIG. 6 illustrates an exemplary display for a sheet-type product in accordance with yet another embodiment of the present invention.

FIG. 6 illustrates a display 70 for absorbent products in accordance with yet another embodiment. As shown, the display 70 may include an advertising aspect 72 and a sampling aspect 74. The advertising aspect 72 may include advertising text or other visual representations related to the product. Further, other features may be included with the advertising aspect, such as other advertising indicia, embellishments, coupons, recorded messages, audio, video, etc. The sampling aspect 74 generally includes a plurality of product samples. In the embodiment shown, paper towels are displayed and the sampling aspect 74 provides sheets of paper towels. Each product sample may be provided with indicia 80 establishing the identity of the product. Instructions 76 may be provided instructing a consumer to take a sample from the sampling aspect 74.

The display 70 may be provided with a coupling member for affixation to a suitable support. For example, the display 70 may be provided with a coupling member for affixation to a palletized unit 78. The coupling member may comprise, for example, an adhesive provided on a rear surface of the display. Thus, the display 70 may easily be placed on a palletized or other shipping or display unit 78. In such configuration, the display 70 may be sent to stores with normal shipment of the product. In certain retail settings, such as, for example, direct-consumer warehouses, the palletized unit 78 may be placed in an aisle with the display 70 provided as shown. Thus, the display illustrating the product and providing product samples may be put before the consumer using only normal distribution of the product. The display 70 also may be attached to a retailer's shelf or other display structure.

Figure 7:
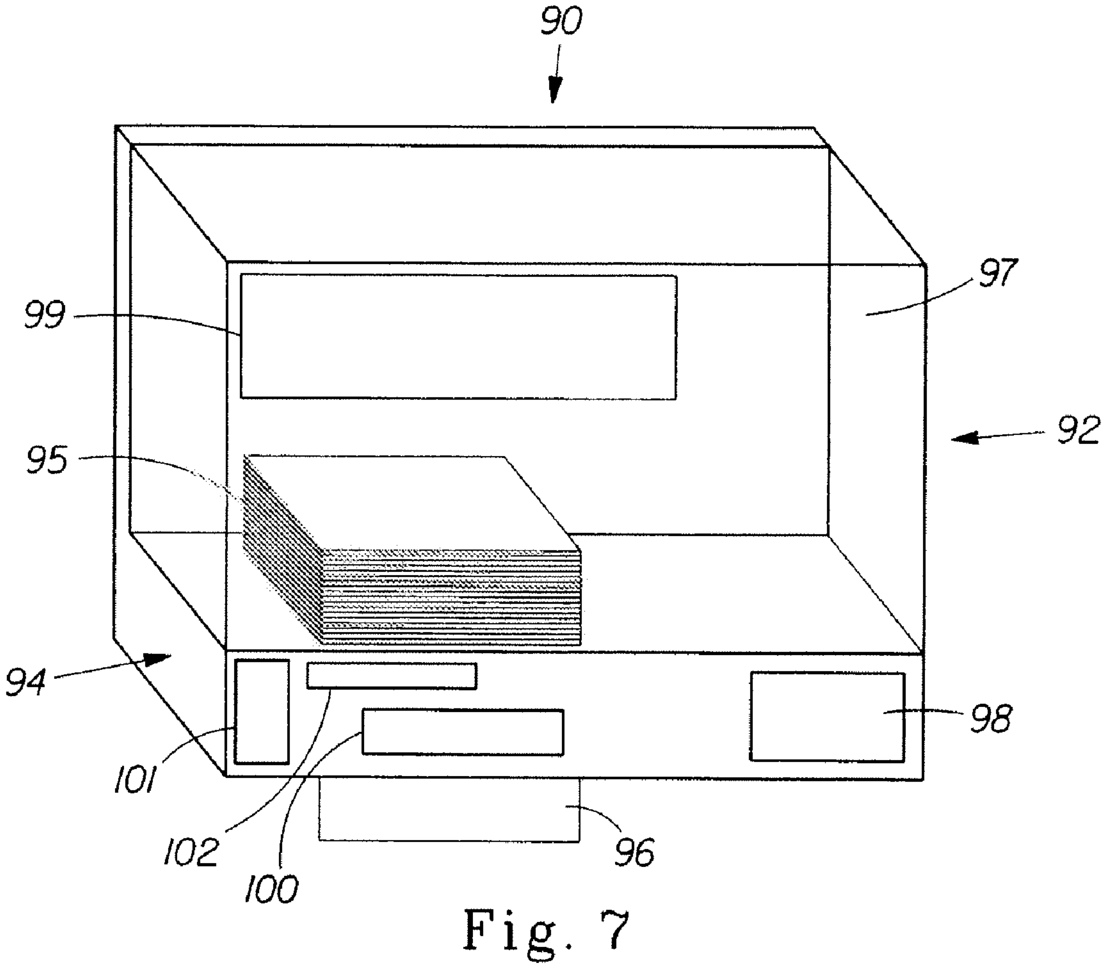
FIG. 7 illustrates an exemplary display for a stacked product in accordance with yet another embodiment of the present invention.

FIG. 7 illustrates an embodiment of a display 90 for stacked consumer products. FIG. 7 illustrates the display 90 with tissues such as facial tissues. Alternatively, the display 90 may be used to display other consumer products such as diapers, sanitary napkins, paper napkins, other generally stackable products, etc. As shown, the display 90 may include a visual aspect 92 and a sampling aspect 94. The display 90 may be configured to fit on a pallet or other shipping or display unit.

The visual aspect 92 includes a product display showing the product, and may include advertising information, or other items of visual interest. The item shown by the visual aspect 92 is generally referred to herein as a visual product 95. If the visual product 95 reflects the product sold, the visual product 95 may be an actual product, or it may be a visual simulation, reproduction, or representation of the product. The visual product 95 shown comprises a stack of tissues. The visual aspect 92 may comprise a base, upon which the visual product rests, and a shield 97 (such as a transparent material) for protecting the visual product 95.

Product samples 96 may be associated with the sampling aspect 94 for dispensing to a consumer. For example, product samples 96 may be provided, in whole or part, within the sampling aspect 94. In the embodiment shown, a dispenser is provided on a bottom surface of the sampling aspect 94 such that it appears the product samples 96 are being pulled from the stack of visual product 95. In alternate embodiments, the dispenser may be located on a front surface, a side surface, or other suitable location of the sampling aspect 94. The product samples may be provided in the configuration sold. Thus, for example, the product samples 96 may comprise a stack of facial tissues wherein each facial tissue reflects an actual product as sold. The product samples 96 may alternatively be provided in any other suitable configuration. For example, the product samples may comprise sample tissues sized smaller than those typically sold. The product samples 96 may be fed to the dispenser and extend from the sampling aspect 94. Thus, a consumer may remove a product sample 96 of the product from the dispenser. Text 100 instructing the consumer to take a product sample 96 may be included. The display 90 may be configured such that the final product sample 96 cannot be removed.

Increasingly, consumer products are being enhanced with other features to increase their appeal to consumers. For example, texture, embossing, printing, aloe, calendula balm, chamomile, eucalyptus, menthol, and other ingredients may be added to tissues, absorbent articles, or other products to enhance their feel and/or to impart an added benefit to the product. In the embodiment of FIG. 7, a feature aspect 101 is provided on the display 90 to communicate a feature of the product to the consumer. In the embodiment shown, the feature aspect 101 is a scratch-and-sniff aspect and communicates scent to the consumer. In alternative embodiments, the feature aspect 101 communicates a physical feature such as texture, thickness, softness, smoothness, and/or durability. The feature aspect 101 may be, for example, a single piece of material or may be a stack of removable sheets. In an embodiment communicating scent, the material may be scent-impregnated. Instructions 102 may be included directing the consumer to use the feature aspect 101.

As shown in the embodiment of FIG. 7, the visual aspect 92 may be located above the sampling aspect 94. Thus, there is no visual obstruction of the visual aspect 92. Alternatively, the visual aspect 92 and sampling aspect 94 may be provided at any suitable location of the display 90. As shown and discussed above, the visual product 95, visual aspect 92, the sampling aspect 94, and the dispenser may be designed such that it appears the visual product 95 is being dispensed from the dispenser. A visual display and a product sample are thus provided. Upon depletion of the product samples, the display 90 does not appear empty, and it retains value as a visual display of the visual product 95 via the visual aspect 92. The sampling aspect 92 may be refilled with additional or alternative product samples upon or prior to depletion of the product samples. Further, if a feature aspect 101 is included, the consumer can continue to sample the feature of the product.

Other features may be included with the display. For example, other advertising indicia, embellishments, coupons, recorded messages, audio, video, etc. may be added to the display. FIG. 7 illustrates advertising text 99, instructions 100 to take a sample of the product, and instructions 102 to use the feature aspect 101. The display 90 further comprises an incentive to buy the product, such as a stack of removable coupons 98 for the product. It is to be recognized that these other features, including the feature aspect 101 and the stack of removable coupons 98, may be used with any embodiment of the present invention.

The display 90 may be provided having a geometry substantially the same as the geometry of a unit for any distribution or display purpose. Accordingly, it is not necessary to rearrange a shipping container or store space to fit the display 90. The display 90 may be provided in the form of a unit having substantially the same geometry of one or more regular units of the product. In such configuration, the display 90 may be sent to stores with normal shipment of the product, or may be sent separately and added at any time. In certain retail outlets, such as, for example, direct-consumer warehouses, a palletized unit may be placed in an aisle with the display 90 provided as shown. Thus, the display illustrating the product and/or providing product samples may be put before the consumer using only normal distribution of the product. In an embodiment where the display 90 has substantially the same geometry of product units for placement in the store, the display 90 may easily be placed in the store in the place of a normal product unit without requiring rearrangement.

Figure 8:
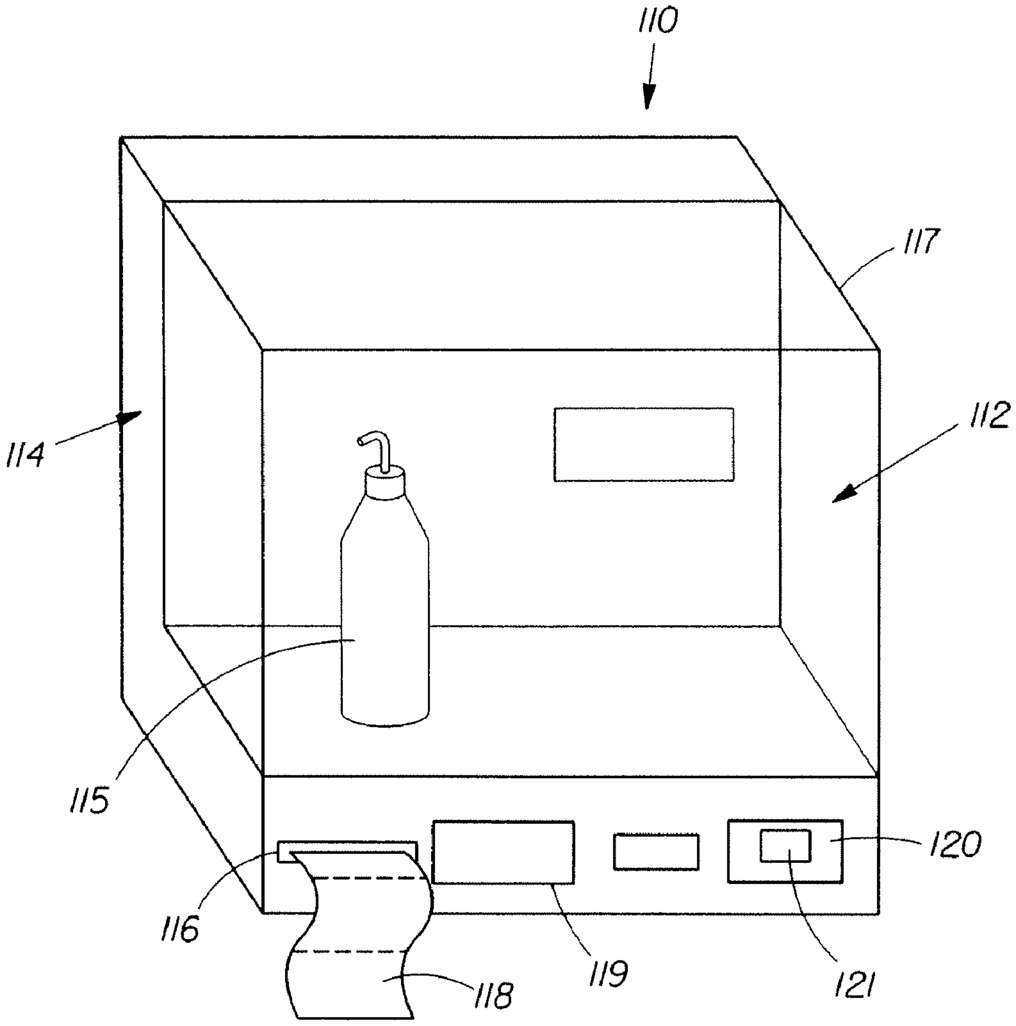
FIG. 8 illustrates an exemplary display having a closed container consumer product in accordance with yet another embodiment of the present invention.
Figure 9:
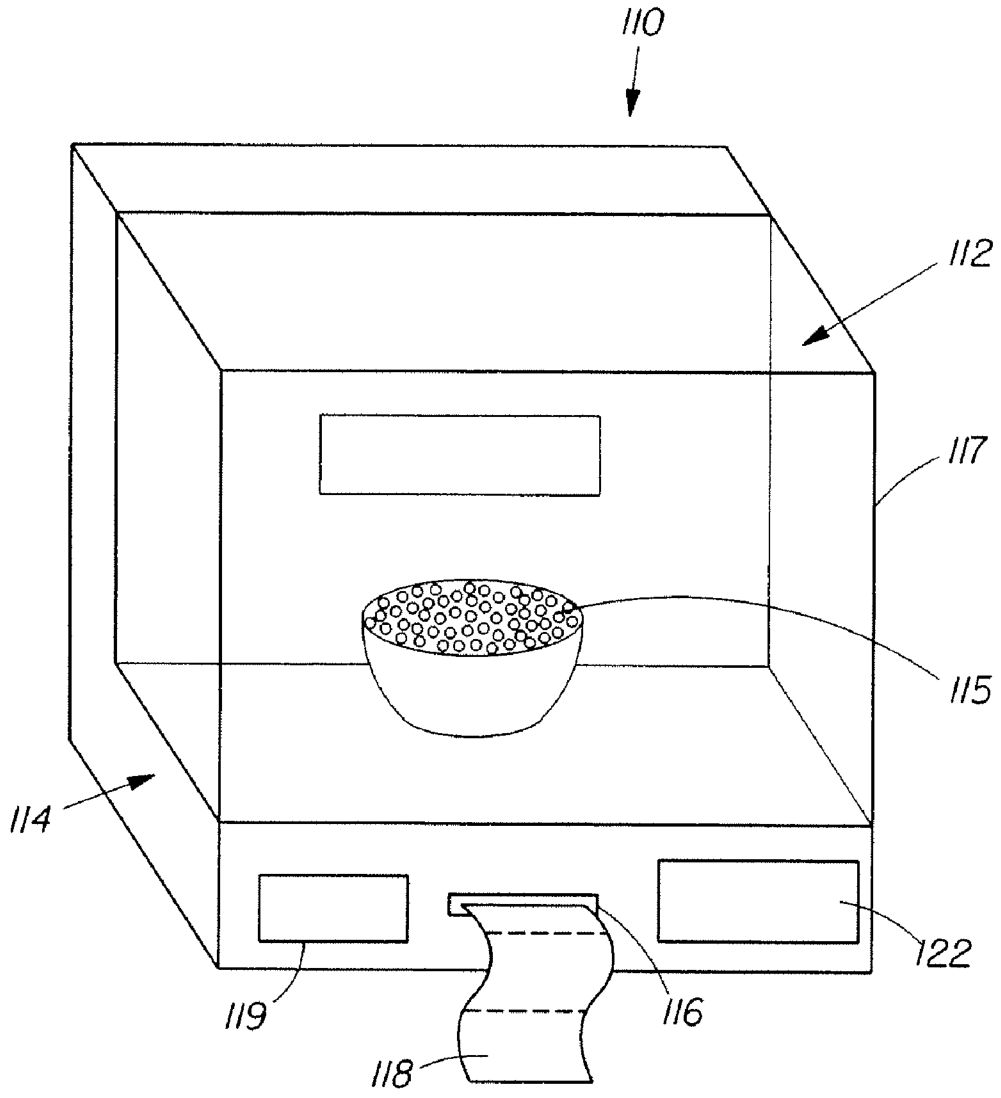
FIG. 9 illustrates an exemplary display of a consumer product in an open container in accordance with yet another embodiment of the present invention.

FIGS. 8 and 9 illustrate embodiments of a display 110 wherein product samples 118 such as packets of product are dispensed. In alternative embodiments, the product samples 118 may comprise a carrier material having product or a product simulation thereupon, actual samples of the product, or other sampling units. FIG. 8 illustrates a display 110 having a closed container consumer product. FIG. 9 illustrates a display 110 having an open container housing a consumer product. As shown, the displays 110 may include a visual aspect 112, a sampling aspect 114, and a dispenser 116.

The visual aspect 112 includes a product display showing the product, and may include the product container, advertising information, or other items of visual interest. The item shown by the visual aspect 112 is herein generally referred to as a visual product 115. If the visual product 115 reflects the product sold, the visual product 115 may be an actual product, a visual simulation or reproduction of the product, or a container that represents the product it contains. In FIG. 8, the visual product 115 comprises a closed container consumer product such as lotion, perfume, moisturizer, etc. In FIG. 9, the visual product 115 comprises an open container of a product such as snack food, coffee, tea, etc. The visual aspect 112 may comprise a base, upon which the visual product 115 rests, and a shield 117 (such as a transparent material) for protecting the visual product 115. Where the visual product 115 is an actual product that is in liquid or particulate form in normal conditions, the visual product 115 may be provided in any suitable form, including a solid form, a photograph, a representation of the product, packaged product, or a particulate version of the product that has been solidified into a solid mass.

Product samples 118 are associated with the sampling aspect for dispensing to a consumer via the dispenser 116. For example, the product samples 118 may be provided, in whole or in part, within the sampling aspect 114. The product samples 118 may comprise individual packets containing product, individual products, products provided in any suitable carrier, or other samples. In an embodiment wherein the product samples 118 comprise packets containing product, the packets may be provided in a continuous strip with perforations provided between each packet. The packets may be, for example, packets of lotion, packets of food, tea bags, etc. The product samples 118 may be fed to the dispenser 116 and extend from the sampling aspect 114. Thus, a consumer may remove a sample 118 of the product from the dispenser 116. Text 119 instructing the consumer to take a sample 96 may be included.

In addition to providing product samples, the display 110 may be used to showcase a specific feature of the product. For example, in the embodiment of FIG. 8, the scent of the product may be of particular interest. Thus, removable cards 120 having a scented aspect 121 are provided. Alternatively, any feature may be communicated via the removable cards 120. For example, the removable cards 120 may communicate a physical feature such as texture, thickness, softness, smoothness, and/or durability. The final card 120 may be provided in a non-removable fashion such that at least one sample remains on the display 110. The scented aspect 121 may be provided in any manner as is known in the art. In the embodiment of FIG. 9, where a food product is displayed, serving suggestions or recipes may be provided on removable cards 122. The final card 122 may be provided in a non-removable fashion or printed directly on the display 110 such that a serving suggestion or recipe remains on the display 110.

In the embodiments of FIGS. 8 and 9, the visual aspect 112 is located in front of the casing of the sampling aspect 114. Thus, in the embodiment shown there is no visual obstruction of the visual aspect 112. The visual aspect 112 may alternatively be provided in any suitable location of the display 110. A visual display and a product sample are thus provided. Upon depletion of the product samples 118, the display 110 retains value as a visual display of the visual product 115 via the visual aspect 112. Further, items such as removable cards 120 or serving suggestions 122 remain on the display 110. Additionally, the sampling aspect 114 may be refilled with additional or alternative product samples upon or prior to depletion of the product samples.

Other features may be included with the display. For example, other advertising indicia, embellishments, coupons, recorded messages, audio, video, etc. may be added to the display. The display 110 may further comprise an incentive to buy the product, such as a stack of removable coupons for the product.

The display 110 may be sized to correspond generally with the size of a unit of the product, such that the display 110 may be provided in a palletized or other typical shipping or display unit in lieu of a regular unit of the product, as described above with respect to other embodiments.

Figure 10:
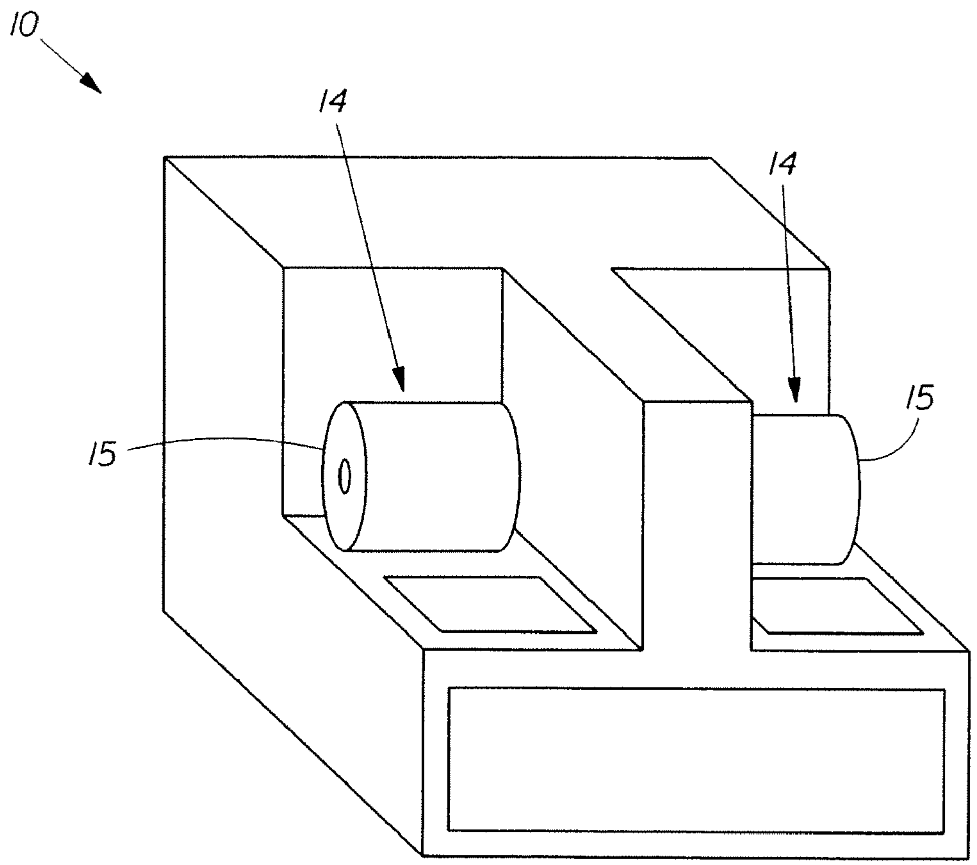
FIG. 10 illustrates an exemplary display of with two visual aspects for a rolled product in accordance with yet another embodiment of the present invention.

FIG. 10 is an exemplary embodiment of the display 10 for a rolled product, such as bath tissue or paper towels. In the embodiment of FIG. 10, the display 10 comprises a visual aspect 14 wherein the visual aspect 14 comprises a three dimensional display. In the embodiment of FIG. 10 two visual products 15 are included in the visual aspect 14 (although as noted supra more than two visual products 15 may be included in one visual aspect.) In one embodiment the two or more visual products 15 are visual products 15 of the same category (for example, the visual products 15 are both paper towels or toilet paper.) Without wishing to be limited by theory, it is thought that consumers may use such a display 10 to perform side-by-side comparisons between the different visual products 15.

Figure 11:
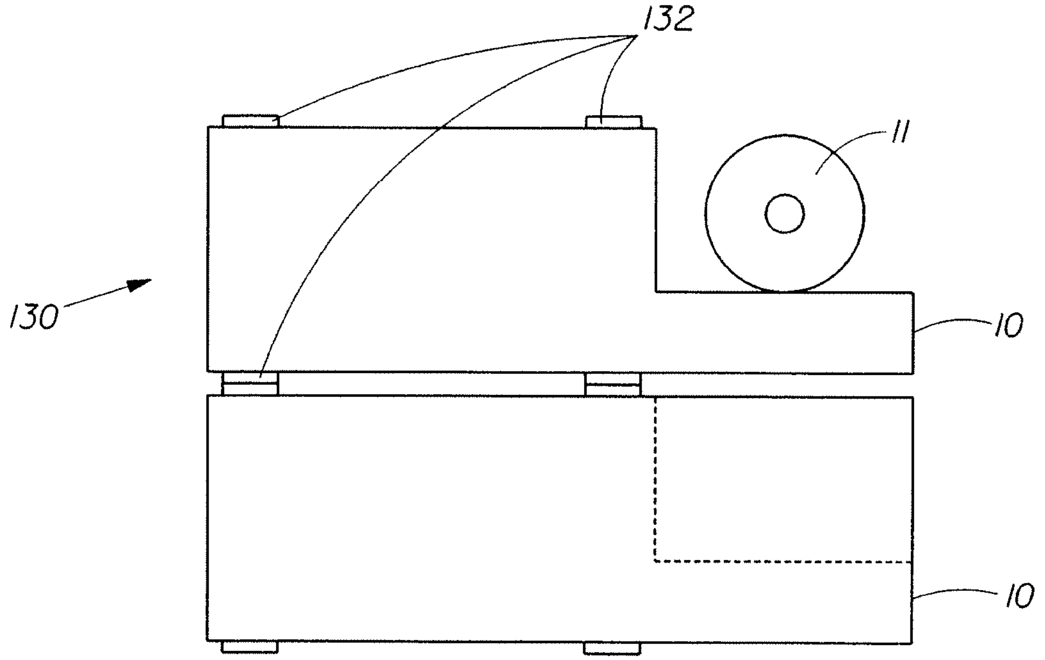
FIG. 11 illustrates an exemplary combined display for a rolled product in accordance with one embodiment of the present invention.

FIG. 11 shows an exemplary embodiment of the display 10 of the present invention. In the embodiment exemplified in FIG. 11, the display 10 further comprises one or more means for attachment 132 wherein two or more displays 10 may be attached together to form a combined display 130. Exemplary means for attachment 132 of a first display to a second display (and so on) include, but are not limited to: Velcro, buttons, snaps, glue strips, and combinations thereof. In one embodiment the combined display 130 is substantially the same dimensions and/or geometry as individual product units. Without wishing to be limited by theory, it is thought that by making a display 10 or combined display 130 substantially the same dimensions and/or geometry as a single product unit, this will allow retailers to more easily put on view the display 10 or combined display 130 because the display unit will fit onto the shelf or pallet space with the actual product being sold and therefore not require additional set-up or considerations (such as, but not limited to: space, location, etc.) when the display 10 is being used. Further, by using two or more display 10 units to form a combined display 130 then when the product samples 11 from one display unit are used up, then the display 10 having no more product samples 11 may be removed from the combined display 130 and another display 10 which has product samples 11 may be used.

Figure 12:
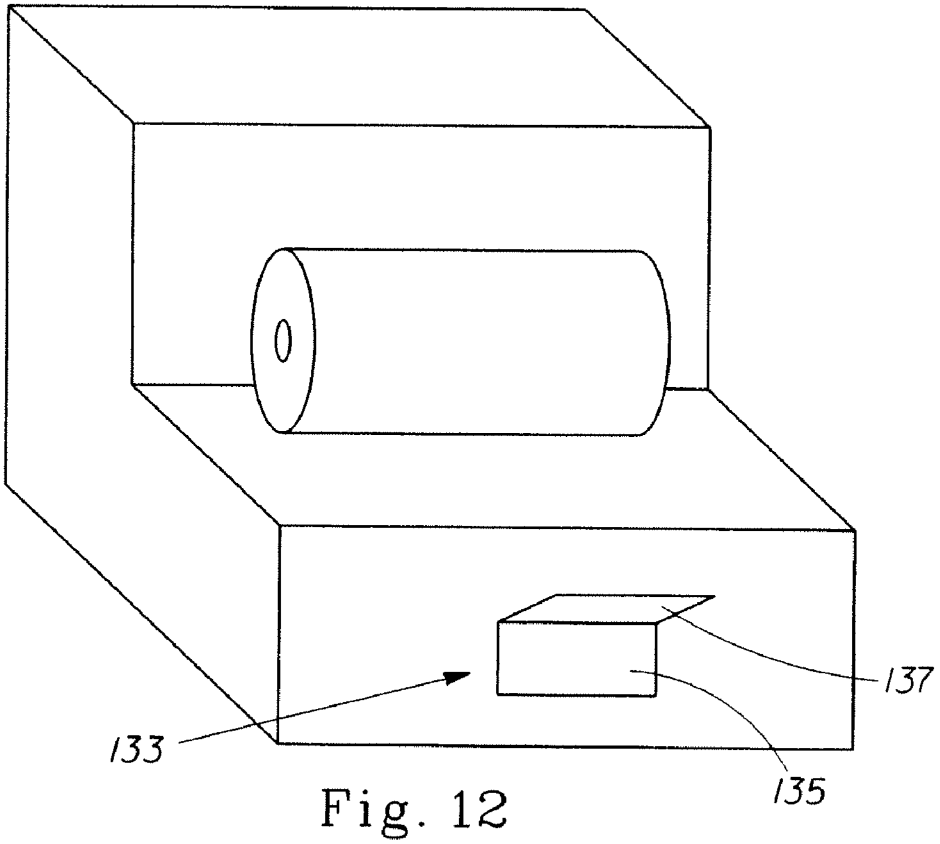
FIG. 12 illustrates an exemplary display having a disposal area in accordance with one embodiment of the present invention.

FIG. 12 shows an exemplary embodiment of the display 10 of the present invention. In one embodiment of the invention, the display 10 further comprises a disposal area 133 wherein a consumer may dispose of product samples 11 that have been used. In one embodiment the disposal area 133 comprises an opening in the display wherein used product samples 11 may be deposited into the body of the display 10 such that the used product samples 11 cannot be viewed from the outside of the display 10. In one embodiment the disposal area 133 comprises an opening 135 and a flap 137 that is attached to the display 10 that covers the opening.

Figure 13:
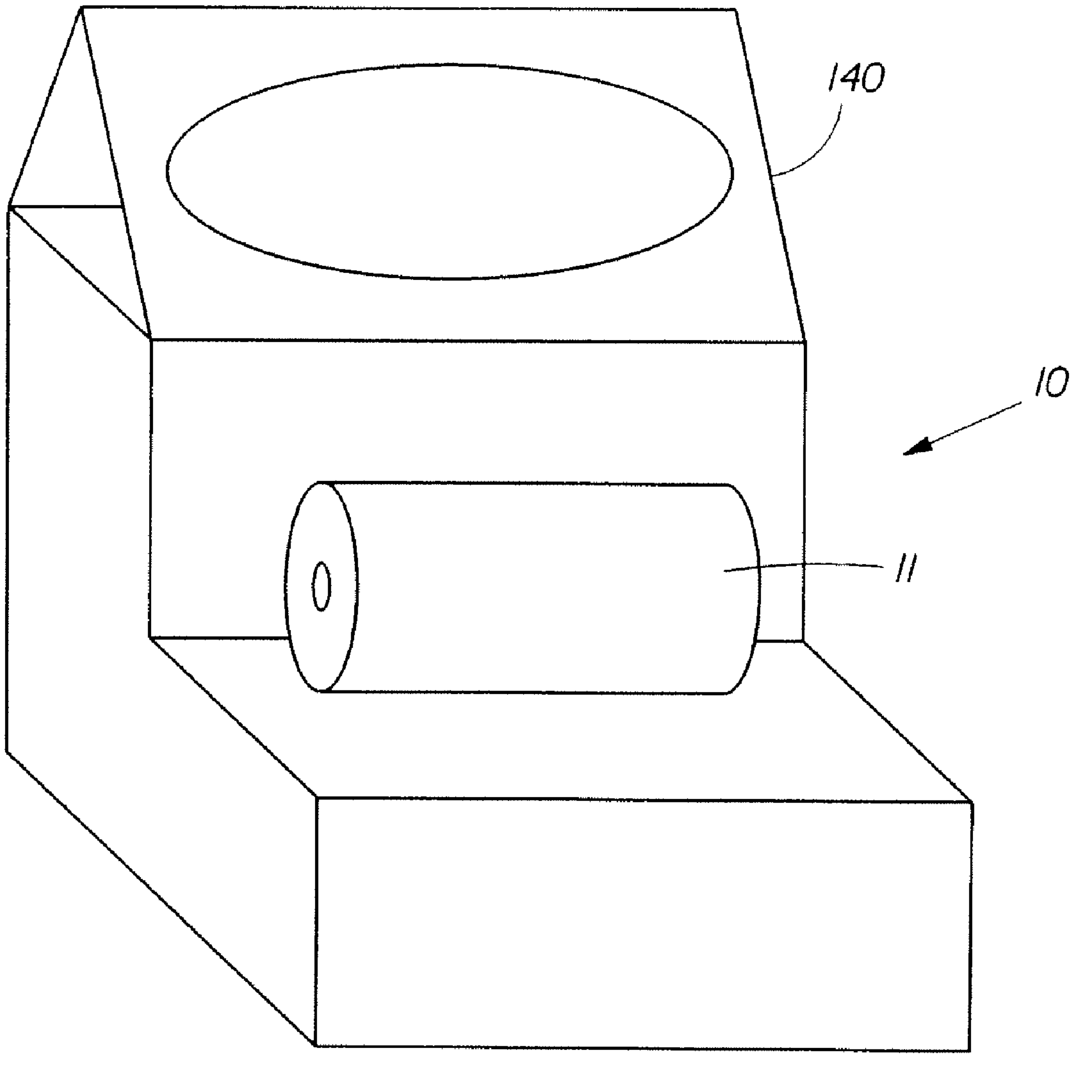
FIG. 13 illustrates an exemplary display having a display flap in accordance with one embodiment of the present invention.

FIG. 13 shows an exemplary embodiment of the display 10 of the present invention. In one embodiment of the invention, the display 10 comprises a display flap 140 that can be raised off of the surface and/or body of the display 10. The display flap 140 may comprise messages, artwork, logos, trademarks, marketing tools, or combinations thereof. In one embodiment, the display flap 140 is the portion of the outside housing of a display that may be opened to expose product samples 11. Exemplary marketing tools are discussed in U.S. patent application Ser. No. 11/483,508.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as “40 mm” is intended to mean “about 40 mm”.

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A palletized unit comprising:

plurality of units of products, each unit comprising a geometry and size;

a display for two or more products comprising:

two or more three-dimensional visual aspects providing visual information about two or more products, the visual aspects comprising:

a first visual product;

a second visual product;

a first sampling aspect for the first visual product;

a second sampling aspect for the second visual product;

product samples associated with both the first sampling aspect and the second sampling aspect; and a dispenser for dispensing the product samples;

wherein the display comprises a geometry that is substantially the same as the geometry of a unit of the product and the display is sized to correspond with the size of a unit of the product.

2. The palletized unit of claim 1 wherein the product samples are actual samples of the products.

3. The palletized unit of claim 1 wherein the product samples are representative samples of the products.

4. The palletized unit of claim 1 wherein the products are rolled toilet tissue products.

5. The palletized unit of claim 1 wherein the products are rolled paper towel products.

6. The palletized unit of claim 1 further comprising a display flap.

7. The palletized unit of claim 1 wherein the visual aspect appears to contain product after the product samples are depleted.

8. The palletized unit of claim 1 wherein the product is a stacked facial tissue product.

9. The palletized unit of claim 1 wherein the visual aspect, sampling aspect, and dispenser are configured such that it appears the visual aspect is feeding the dispenser.

10. The palletized unit of claim 1 wherein the product of the first visual product and the second visual product are configured to roll when the product samples are dispensed.

11. A palletized unit comprising:

plurality of units of products, each unit comprising a geometry and size;

a display for one or more products comprising:

a first display and a second display wherein each comprise:

a three-dimensional visual aspect providing visual information about the product, the visual aspect including a visual product;

a sampling aspect;

product samples associated with the sampling aspect;

a dispenser for dispensing the product samples; and wherein the first display and the second display each comprise a geometry that is substantially the same as the geometry of a unit of the product and the first display and the second display are each sized to correspond with the size of a unit of the product.

12. The palletized unit of claim 11 wherein the display further comprises a means for attaching the first display to the second display.

13. The palletized unit of claim 12 wherein the means for attaching the first display to the second display is Velcro™.

14. The palletized unit of claim 11 wherein the product samples are actual samples of the product.

15. The palletized unit of claim 11 wherein the display further comprises a disposal area.

16. The palletized unit of claim 11 wherein the product is a rolled toilet paper product.

17. The palletized unit of claim 11 wherein the product is a rolled paper towel product.

18. The palletized unit of claim 11 wherein the visual aspect appears to contain product after the product samples are depleted.

19. The palletized unit of claim 11 wherein the product is a stacked facial tissue product.

20. The palletized unit of claim 11 wherein the visual aspect, sampling aspect, and dispenser are configured such that it appears the visual aspect is feeding the dispenser.

21. The palletized unit of claim 11 wherein the first visual product and the second visual product are configured to roll when the product samples are dispensed.

* * * * *